United States Patent
Chang et al.

(10) Patent No.: US 11,674,866 B2
(45) Date of Patent: Jun. 13, 2023

(54) TESTING BOX PROOFED AGAINST LIGHT FLARES DURING THE TESTING OF IMAGE-CAPTURING DEVICES

(71) Applicant: TRIPLE WIN TECHNOLOGY(SHENZHEN) CO.LTD., Shenzhen (CN)

(72) Inventors: Xin-Ru Chang, Shenzhen (CN); Yu-Tsang Tu, New Taipei (TW)

(73) Assignee: TRIPLE WIN TECHNOLOGY(SHENZHEN) CO.LTD., Shenzhen (CN)

( * ) Notice: Subject to any disclaimer, the term of this patent is extended or adjusted under 35 U.S.C. 154(b) by 388 days.

(21) Appl. No.: 17/023,183

(22) Filed: Sep. 16, 2020

(65) Prior Publication Data

US 2021/0372880 A1  Dec. 2, 2021

(30) Foreign Application Priority Data

May 27, 2020  (CN) .......................... 202020922990.5

(51) Int. Cl.
   *G01M 11/02*  (2006.01)
(52) U.S. Cl.
   CPC .... *G01M 11/0214* (2013.01); *G01M 11/0207* (2013.01); *G01M 11/0257* (2013.01); *G01M 11/0264* (2013.01)
(58) Field of Classification Search
   CPC ............. G01M 11/04; G01M 11/0214; G01M 11/0207; G01M 11/0257; G01M 11/0264
   See application file for complete search history.

(56) References Cited

U.S. PATENT DOCUMENTS

| | | | | |
|---|---|---|---|---|
| 4,991,007 A | * | 2/1991 | Corley | H04N 17/002 348/188 |
| 6,693,704 B1 | * | 2/2004 | Ooki | G03F 7/706 356/124 |
| 7,375,362 B2 | * | 5/2008 | Treves | G01N 21/55 250/559.4 |
| 2009/0137105 A1 | * | 5/2009 | Im | H01L 21/02686 204/192.1 |
| 2019/0004415 A1 | * | 1/2019 | Huang | G03B 43/00 |

FOREIGN PATENT DOCUMENTS

CN          205566537 U  *  9/2016

* cited by examiner

*Primary Examiner* — Tarifur R Chowdhury
*Assistant Examiner* — Amanda H Merlino
(74) *Attorney, Agent, or Firm* — ScienBiziP, P.C.

(57) ABSTRACT

A camera-testing box for testing optical properties of an image-capturing device includes a box body, a light source, a photographic film, a mask, and a base. The light source is disposed inside the light-free box body. The photographic film is disposed on a side of the light source inside the box body. The mask is disposed on a side of the photographic film away from or facing the light source, and the mask includes a transparent area and a shielding area to reduce flare-causing light reflected by screws and other extraneous objects in the camera-testing box. The base is disposed inside the box body, and on a side of the mask away from the light source. The base supports the to-be-tested image-capturing device.

8 Claims, 5 Drawing Sheets

1

TESTING BOX PROOFED AGAINST LIGHT FLARES DURING THE TESTING OF IMAGE-CAPTURING DEVICES

FIELD

The subject matter herein generally relates to imaging and particularly a camera-testing box.

BACKGROUND

Electronic products, such as mobile phones and tablet computers, can have optical lenses. To test a photo quality of the optical lens, the optical lens is placed in a testing box including a light source. The light source emits light to illuminate a preset picture, and the optical lens captures photos of the picture. The photos are then analyzed to test the image-capturing quality of the optical lens. However, the light may also illuminate other objects, such as turntables, screws, and circuit boards, in the testing box. These objects may reflect light towards the image-capturing device, which causes the captured photos to have flares. Thus, a testing accuracy of the optical lens is affected.

BRIEF DESCRIPTION OF THE DRAWINGS

Implementations of the present technology will now be described, by way of example only, with reference to the attached figures.

DETAILED DESCRIPTION

Figure 1:
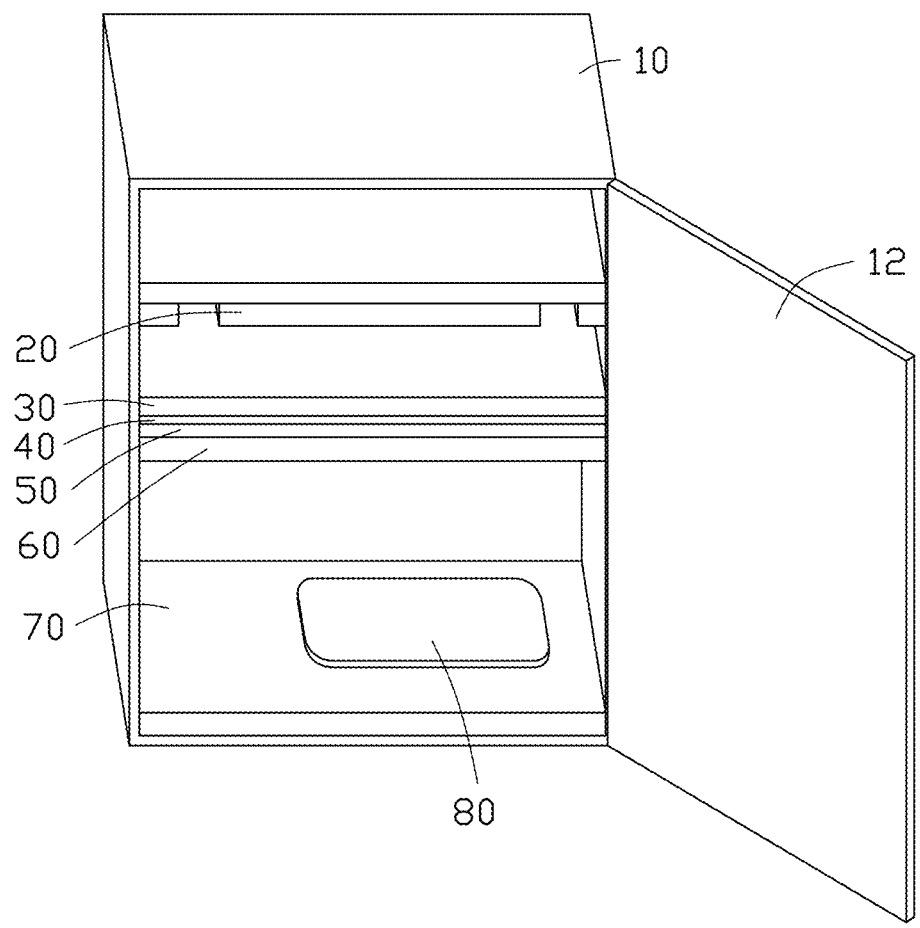
FIG. 1 is a diagrammatic view of an embodiment of a camera-testing box.

It will be appreciated that for simplicity and clarity of illustration, where appropriate, reference numerals have been repeated among the different figures to indicate corresponding or analogous elements. In addition, numerous specific details are set forth to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Referring to FIG. 1, an embodiment of the present disclosure provides a camera-testing box 100, which can test optical properties of a to-be-tested object 80. The to-be-tested object 80 has a lens for capturing images. The to-be-tested object 80 includes, but is not limited to, a camera or an optical detector.

The camera-testing box 100 includes a box body 10, a light source 20, a light diffusion sheet 30, a photographic film 40, a mask 50, a support plate 60, and a base 70.

The box body 10 houses the light source 20, the light diffusion sheet 30, the photographic film 40, the mask 50, the support plate 60 and the base 70. The box body 10 also houses the to-be-tested object 80.

In an embodiment, the box body 10 is hollow and substantially rectangular. The box body 10 is made of opaque material, to prevent the light inside the box body 10 from exiting out of the box body 10 or the light outside the box body 10 from entering the box body 10 during tests. The box body 10 has a door 12 that can be opened or closed, which facilitates easy removal and placement of objects when the door 12 is opened or closed. When the to-be-tested object 80 is tested, the door 12 is closed and the inside of the box body 10 is totally dark.

In an embodiment, the color of the inside of the box body 10 is black.

The light source 20 is fixed inside the box body 10. The light source 20 can emit light.

The support plate 60 is disposed on a side of the light source 20 and is spaced apart from the light source 20. The support plate 60 is made of a transparent material, such as glass. The support plate 60 can support the light diffusion sheet 30, the photographic film 40, and the mask 50.

In an embodiment, the light diffusion sheet 30, the photographic film 40, and the mask 50 are sequentially stacked on the support plate 60. The light diffusion sheet 30 is disposed on a side of the photographic film 40 facing the light source 20. The mask 50 is disposed on a side of the photographic film 40 away from or facing the light source 20. In an embodiment, the mask 50 is disposed on the side of the photographic film 40 away from the light source 20.

The light diffusion sheet 30 is spaced apart from the light source 20. The light diffusion sheet 30 adjusts the direction of the light emitted by the light source 20, to refract, reflect, or scatter the light in different directions. Thereby, the light illuminating the to-be-tested object 80 can have uniform brightness.

Figure 2:
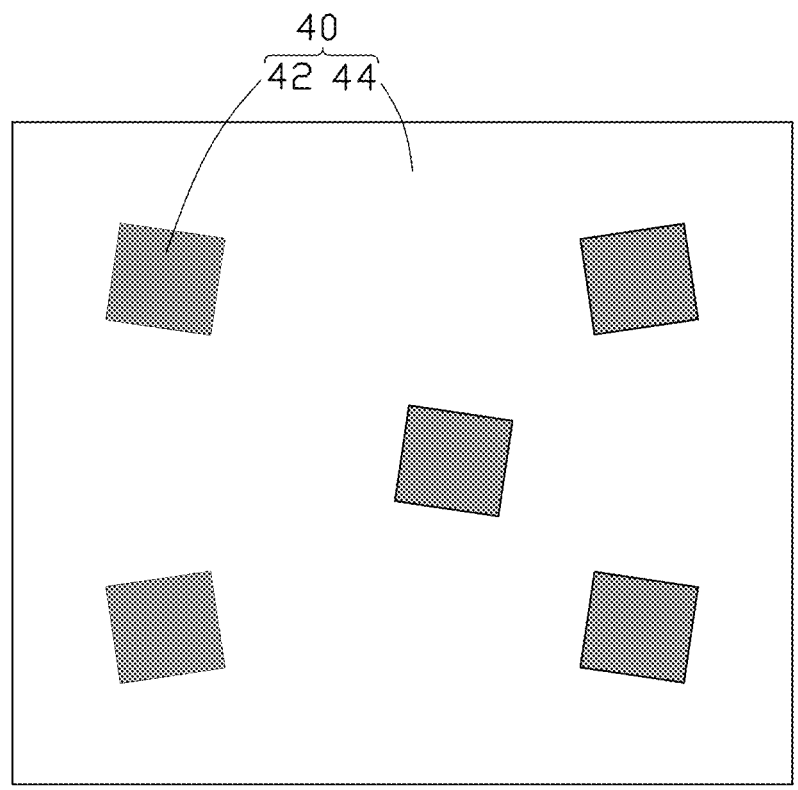
FIG. 2 is a diagrammatic view of a photographic film of the camera-testing box of FIG. 1.
Figure 3:
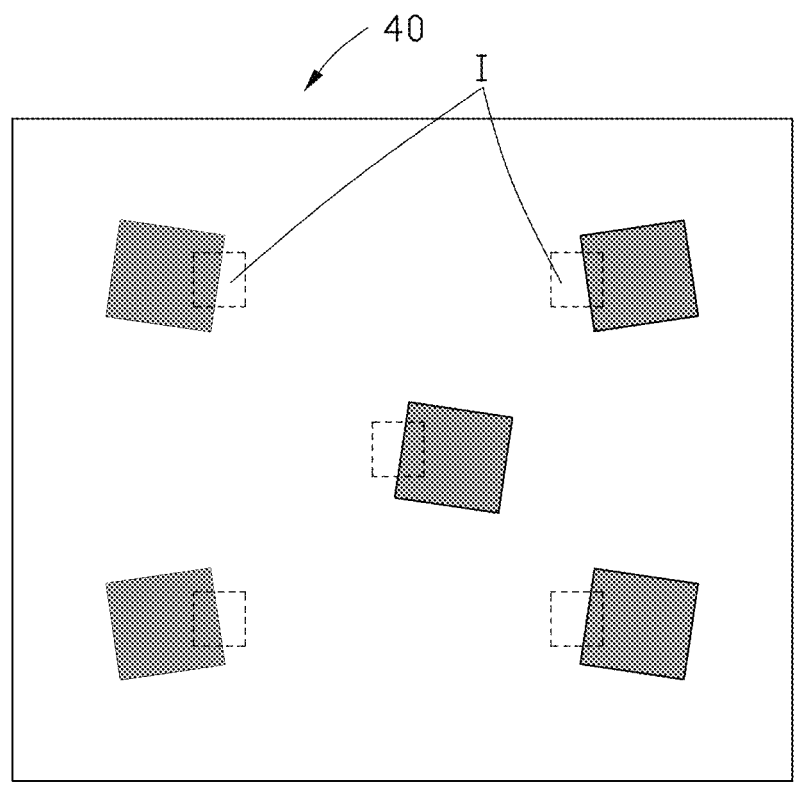
FIG. 3 is a diagrammatic view of the photographic film of FIG. 2, a portion of the photographic film being unshielded.

Referring to FIGS. 2 and 3, the photographic film 40 includes a patterned area 42 and a non-patterned area 44. The patterned area 42 is opaque or not completely transparent. The non-patterned area 44 is transparent. The light can pass through the non-patterned area 44 to form patterns corresponding to the non-patterned area 44.

Figure 4:
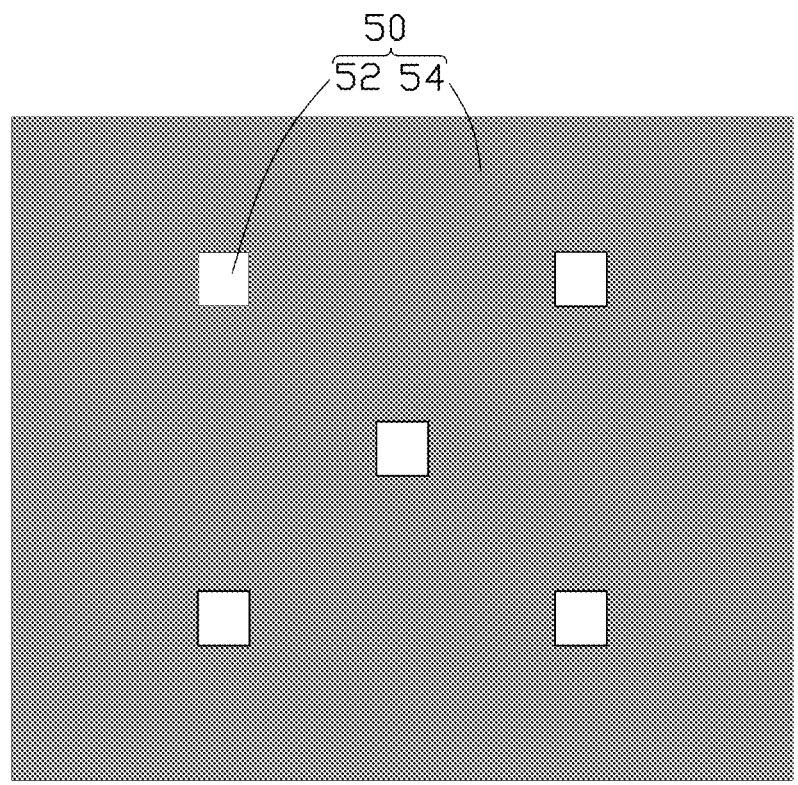
FIG. 4 is a diagrammatic view of a mask used in the camera-testing box of FIG. 1.

Referring to FIG. 4, the mask 50 includes a transparent area 52 and a shielding area 54. The transparent area 52 allows the light to pass through. The shielding area 54 prevents the light from passing through.

In one embodiment, the shielding area 54 is made of an opaque material, and the transparent area 52 is hollow. In another embodiment, the shielding area 54 is made of an opaque material, and the transparent area 52 is made of a transparent material.

The shielding area 54 has a low reflectivity. The shielding area 54 can be made of metal or wood. In another embodiment, the mask 50 comprises cut-out patterns in a paper.

The size of the mask 50 can be changed according to the size of the camera-testing box 100, the photographic film 40, or the support plate 60. In an embodiment, the size of the mask 50 is greater than or equal to the size of the support plate 60.

The mask 50 can be fixed in the camera-testing box 100, for example, by gluing or mechanical fixing. The mask 50 may also defined on the support plate 60 (that is, the support plate 60 is transparent, and includes the transparent area 52 and the shielding area 54). The photographic film 40 and the mask 50 may also be integrally formed.

The transparent area 52 and the shielding area 54 can be set according to the patterned area 42 and the light that needs to pass through the photographic film 40. The transparent area 52 overlaps at least a portion of the non-patterned area 44, and the shielding area 54 overlaps at least a portion of the non-patterned area 44. The light passes through the transparent area 52 and the portion of the non-patterned area 44 overlapping the transparent area 52, the light not being able to pass through the shielding area 54.

Figure 5:
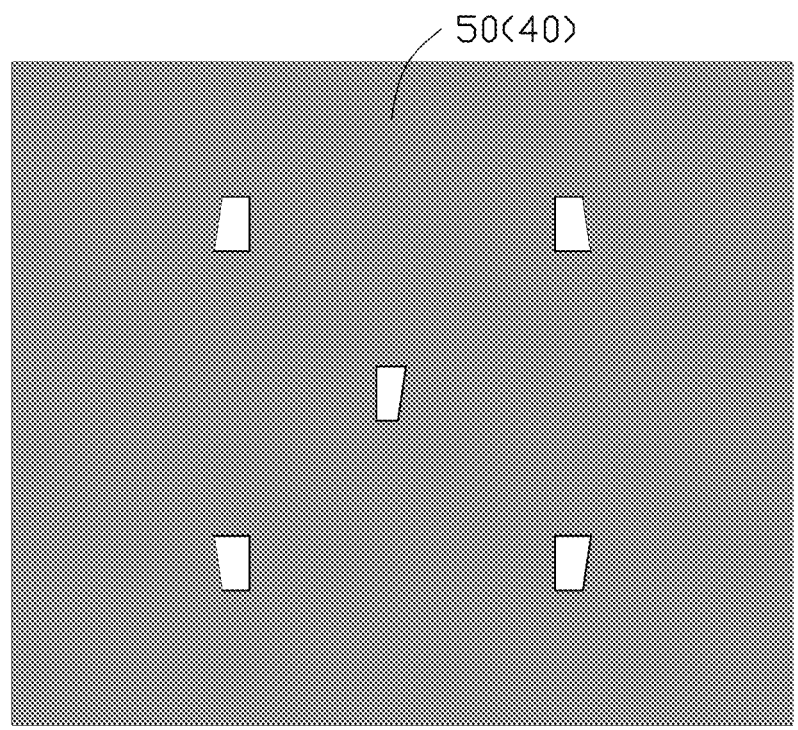
FIG. 5 is a diagrammatic view showing the mask of FIG. 4 overlapped with the photographic film of FIG. 2.

Referring to FIGS. 2 and 3, in an embodiment, the patterned area 42 of the photographic film 40 is opaque. An area of the patterned area 42 is 12% of an area of the photographic film 40, that is, a light transmission area of the photographic film 40 is 88% of the area of the photographic film 40. An area I in the photographic film 40 does not need to be shielded, so that the transparent area 52 can be designed corresponding to the area I (as shown in FIG. 4). Referring to FIG. 5, the mask 50 is disposed on the photographic film 40, and the area I is 1.3% of the area of the photographic film 40. Therefore, the light received by objects in the box body 10 is reduced, thus the light projected on the photographic film 40 and reflected by the objects, is also reduced. Therefore, the testing of optical properties of the to-be-tested object 80 is not affected.

The base 70 is disposed on the side of the support plate 60 away from the light source 20. For example, when the light source 20 is disposed at an upper portion inside the box body 10, the base 70 may be disposed at the upper portion inside the box body 10. When the light source 20 is disposed at a lower portion inside the box body 10, the base 70 may be disposed at the upper portion inside the box body 10. The base 70 is spaced apart from the support plate 60 and can support the to-be-tested object 80. The to-be-tested object 80 can capture images of the photographic film 40 irradiated by the light source 20. The optical properties of the to-be-tested object 80 are detected and analyzed according to the captured images.

With the above configuration, by providing the mask 50 between the light source 20 and the base 70, light reflected by objects out of the overall light projected on the photographic film 40 is much reduced. Thus, the testing of the to-be-tested object 80 is not affected, thereby improving the accuracy of the results of testing.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A camera-testing box, comprising:
   a box body;
   a light source disposed inside the box body and configured to emit light;
   a photographic film disposed on a side of the light source inside the box body;
   a mask disposed on a side of the photographic film away from or facing the light source, the mask comprising a transparent area and a shielding area, the shielding area made of an opaque material; and
   a base disposed inside the box body, the base disposed on a side of the mask away from the light source, and the base configured to support a to-be-tested object;
   wherein the photographic film comprises a patterned area and a non-patterned area, the transparent area overlaps at least a portion of the non-patterned area, the shielding area overlaps at least another portion of the non-patterned area, thereby allowing the light to pass through the transparent area and the portion of the non-patterned area overlapping the transparent area, and further preventing the light from passing through the shielding area.

2. The camera-testing box of claim 1, wherein the transparent area is hollow.

3. The camera-testing box of claim 1, wherein the transparent area is made of a transparent material.

4. The camera-testing box of claim 1, wherein the mask is fixed in the camera-testing box by gluing.

5. The camera-testing box of claim 1, wherein the mask is fixed in the camera-testing box by mechanical fixing.

6. The camera-testing box of claim 1, wherein the camera-testing box further comprises a support plate, the support plate is disposed in the box body and spaced apart from the light source, the support plate is transparent, and the photographic film is placed on the support plate.

7. The camera-testing box of claim 6, wherein the support plate further comprises the transparent area and the shielding area.

8. The camera-testing box of claim 7, wherein the camera-testing box further comprises a light diffusion sheet disposed on the support plate, and the light diffusion sheet is disposed on a side of the photographic film facing the light source.

* * * * *